United States Patent [19]

Eckel et al.

[11] Patent Number: 5,191,017
[45] Date of Patent: Mar. 2, 1993

[54] HIGH-IMPACT THERMOPLASTIC POLYETHER SULFONE MOLDING COMPOSITIONS

[75] Inventors: Thomas Eckel, Dormagen; Dieter Wittmann, Cologne; Karl-Heinz Ott, Leverkusen; Christian Lindner, Cologne, all of Fed. Rep. of Germany

[73] Assignee: Bayer Aktiengesellschaft, Fed. Rep. of Germany

[21] Appl. No.: 702,984

[22] Filed: May 20, 1991

Related U.S. Application Data

[63] Continuation-in-part of Ser. No. 446,753, Dec. 6, 1989, abandoned.

[30] Foreign Application Priority Data

Dec. 10, 1988 [DE] Fed. Rep. of Germany ....... 3841670

[51] Int. Cl.$^5$ ...................... C08G 63/48; C08G 63/91
[52] U.S. Cl. ...................................... 525/68; 525/67; 525/64; 525/906
[58] Field of Search ...................... 525/68, 67, 64, 906

[56] References Cited

U.S. PATENT DOCUMENTS

| | | | |
|---|---|---|---|
| 3,555,119 | 1/1971 | Ingulli et al. | 260/876 |
| 3,646,162 | 2/1972 | Lauchlan | 260/876 R |
| 4,859,744 | 8/1989 | Lindner et al. | 525/256 |

FOREIGN PATENT DOCUMENTS 3601419 7/1987 Fed. Rep. of Germany .
1196066 6/1970 United Kingdom .

Primary Examiner—John C. Bleutge
Assistant Examiner—Helen F. Lee
Attorney, Agent, or Firm—Joseph C. Gil; Richard E. L. Henderson

[57] ABSTRACT

The invention relates to high-impact polyether sulfone molding compositions containing aromatic polyether sulfones, diene graft polymers and, optionally, other thermoplastic resins, at most half the aromatic polyether sulfone being replaceable by other thermoplastic resins.

11 Claims, No Drawings

HIGH-IMPACT THERMOPLASTIC POLYETHER SULFONE MOLDING COMPOSITIONS

CROSS REFERENCE TO RELATED APPLICATION

This application is a continuation-in-part of U.S. application Ser. No. 07/446,753, filed on Dec. 6, 1989, now abandoned.

BACKGROUND OF THE INVENTION

This invention relates to thermoplastic molding compositions based on aromatic polyether sulfones and grafted, particulate diene rubbers produced by a special synthesis process, to a process for the production of the molding compositions by mixing of the components at elevated temperature and to their use for the production of moldings, primarily by injection molding.

Molding compositions of aromatic polyether sulfones are known. In general, they show very high heat resistance and excellent stability to chemicals but frequently do not achieve the high notched impact strength required for certain applications.

To improve notched impact strength, German Auslegeschrift 1,794,171 and U.S. Pat. Nos. 3,555,119 and 3,646,162 propose mixtures of polyether sulfones with impact modifiers consisting of styrene/acrylonitrile-grafted butadiene rubbers (ABS type). However, any improvement is obtained at the expense of a considerable reduction in the heat resistance of the molding compositions.

In addition to high notched impact strength, a sufficiently high level of weld line strength is required for many applications of polyether sulfone molding compounds, particularly in the automotive field. This is necessary for obtaining even relatively large injection-molded parts with several gate marks in a sufficiently high quality.

Although a level of toughness at room temperature and low temperatures sufficient for many applications of polyether sulfone molding compositions can be obtained with rubber modifiers of the ABS type, as described in German Auslegeschrift 1,794,171, U.S. Pat. Nos. 3,555,119 and 3,646,162, relatively large injection-molded parts show unfavorable mechanical properties because of inadequate weld line strength. It has now surprisingly been found that mixtures of aromatic polyether sulfones and grafted diene rubbers can be processed to molding compositions combining high heat resistance with high weld line strength by using grafted, particulate diene rubbers which have been grafted by a special process. The process according to the invention for the production of the graft polymers is characterized in that an initiator system of an organic hydroperoxide and ascorbic acid is used for the graft polymerization, giving a graft yield of more than 60% by weight.

SUMMARY OF THE INVENTION

The present invention relates to thermoplastic molding compositions comprising (A) 5 to 99% by weight, preferably from 40 to 98 and more preferably from 60 to 97% by weight, based on the total amount of components (A) and (B), of a linear aromatic polyether sulfone, and (B) 1 to 95% by weight, preferably from 2 to 60 and more preferably from 3 to 40% by weight, based on the total amount of components (A) and (B), of a diene graft polymer comprising
  (B.1) 5 to 90. preferably from 20 to 80, parts by weight of a mixture which is grafted on
  (B.2) 10 to 95, preferably from 20 to 80, parts by weight of a diene rubber, and optionally, (C) a thermoplastic resin selected from the group consisting of vinyl copolymer, polyalkylene terephthalate, aromatic polycarbonate and aromatic polyester carbonate, wherein said mixture (B.1) contains
  (B.1.1) 50 to 95 parts by weight of at least one member selected from the group consisting of methyl methacrylate, styrene, α-methylstyrene, nucleus substituted styrene wherein substitution is any of $C_{1-4}$ alkyl and halogen, and
  (B.1.2) 5 to 50 parts by weight of at least one member selected from the group consisting of acrylonitrile, methacrylonitrile, methyl methacrylate, maleic anhydride, maleic imide N-substituted by $C_{1-4}$ alkyl or by phenyl, and wherein said rubber (B.2) has a mean particle diameter of 0.009 to 1 μm, preferably from 0.09 to 0.6 μm, and a gel content of more than 50% by weight, preferably more than 70% and more preferably in the range from 73 to 98% by weight, relative to the weight of said rubber (B.2), and wherein said diene graft polymer (B) is characterized in that an initiator system containing an organic hydroperoxide and ascorbic acid is used in its preparation, and wherein at most half, preferably one third, of the weight of said aromatic polyether sulfone (A) is replaced by said thermoplastic resin (C).

DETAILED DESCRIPTION OF THE INVENTION

Component A

Aromatic polyether sulfones in the context of the invention are linear, thermoplastic polyarylene polyether polysulfones in which the arylene units are interrupted by ether and sulfone bonds. These resins are obtained by reaction of an alkali metal double salt of a dihydric phenol (bisphenol) with a benzoid compound containing two halogen atoms, with either one or both compounds having the sulfone bond (—$SO_2$—) required for the incorporation of sulfone units in the polymer chain containing arylene and ether units. The polyether sulfones and their production are known from the literature (cf., for example, U.S. Pat. No. 3,264,536, British Patent 1,264,900, European Patent Application 038,028).

The polyether sulfone resin has a basic structure comprising recurring units corresponding to formula (I)

$$\text{+O—Z—O—W+} \tag{I}$$

in which
Z is the residue of a dihydric phenol and
W is the residue of the benzoid dihalogen compound containing an inert, electron-attracting group,
with the proviso that both residues Z and W are attached to the ether oxygen atoms at aromatic carbon atoms via covalent bonds and at least one of the residues Z and W contains a sulfone group between aromatic carbon atoms. Polyether sulfones of this type belong to the class of polyarylene polyether resins described in U.S. Pat. No. 3,264,536 incorporated herein by reference.

Preferred diphenols for the production of the aromatic polyether sulfones of component A are compounds corresponding to formula (II)

HO-Z-OH  (II)

in which Z is a difunctional, mononuclear or polynuclear aromatic radical containing from 6 to 30 carbon atoms, the structure of Z being such that the two OH groups are each directly attached to a carbon atom of an aromatic system.

Particularly preferred diphenols are compounds corresponding to the following formula

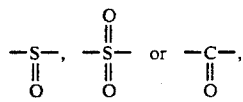
(III)

in which
Y is a single bond, an alkylene or alkylidene radical containing 1 to 7 carbon atoms, a cycloalkylene or cycloalkylidene radical containing 5 to 12 carbon atoms, —O—, —S—,

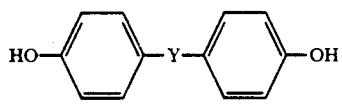

or nucleus-alkylated or nucleus-halogenated derivatives thereof.

Examples of bisphenols are hydroquinone, resorcinol, dihydroxydiphenyls, bis(hydroxyphenyl)alkanes, bis(-hydroxyphenyl)cycloalkanes, bis(hydroxyphenyl) ethers, bis(hydroxyphenyl) ketones, bis(hydroxyphenyl) sulfoxides, bis(hydroxyphenyl) sulfones, and $\alpha,\alpha'$-bis(hydroxyphenyl)diisopropylbenzenes and nucleus-alkylated and nucleus-halogenated derivatives thereof. The most important diphenols are bisphenol A, tetramethyl bisphenol A, 1,1-bis(4-hydroxyphenyl)isobutane, 1,1-bis(4-hydroxyphenyl)cyclohexane, 4,4'-dihydroxydiphenyl sulfide, 4 4'-dihydroxydiphenyl sulfone and di- and tetrahalogenated derivatives thereof. Bisphenol A is particularly preferred. Mixtures of the diphenols mentioned may also be used.

Preferred benzoid dihalogen compounds are binuclear compounds corresponding to formula (IV)

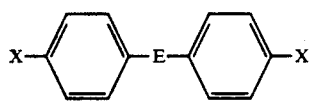
(IV)

in which both groups X represent halogen atoms such as F, Cl, Br, and I atoms, and E represents electron-attracting groups such as, for example, a sulfone, carbonyl, vinyl, sulfoxide or azo group. Each of the two nuclei may additionally contain one or more substituents from the group of saturated hydrocarbons or electron-attracting compounds. Preferred benzoid dihalogen compounds are 4,4'-dichlorodiphenyl sulfone and 4,4'-dichlorobenzophenone.

Possible branching agents are those mentioned for the production of aromatic polyesters (German Offenlegungsschrift 2,940,024) and for the production of aromatic polyester carbonates (German Offenlegungsschrift 3,007,934; see pages 9 and 10).

Preferred chain terminators for the aromatic polyether sulfones of component A are phenol, alkyl phenols containing $C_1-C_{12}$ alkyl groups and halogenated phenols and also bromides and chlorides of $C_1-C_{10}$ alkanes in quantities of from 0.1 to 10 mol-% (based on diphenols in the case of phenols and on the aromatic dihalogen compounds in the case of chlorides).

The reduced viscosities ($\eta_{red}$) of the aromatic polyether sulfones A are in the range from 0.15 to 1.5 dl/g and preferably in the range from 0.35 to 0.65 dl/g (as measured on solutions of 20 mg polyether sulfone A in 10 ml CHCl₃ at 25° C.).

Component B

According to German Offenlegungsschrift 3,708,913 (believed to correspond to U.S. Pat. No. 4,859,744), graft polymers of resin-forming monomers on rubbers can be produced with a high graft yield (so that they contain surprisingly small amounts of free polymers) providing the graft polymerization is carried out in emulsion using an initiator system of an organic hydroperoxide and ascorbic acid.

In one preferred embodiment, the graft polymerization of the monomers B.1 is carried out in aqueous emulsion in the presence of an emulsion of the rubber polymer B.2 at temperatures in the range from 40° to 70° C. and more especially at temperatures in the range from 50 to 70° C. using an initiator system of an organic hydroperoxide (I) and ascorbic acid (II). The organic hydroperoxide (I) and ascorbic acid (II), respectively, are used in quantities of 0.3 to 1.5 parts by weight and 0.1 to 1 part by weight to 100 parts by weight graft monomers, with the ratio by weight of (I) to (II) being from 0.3 to 15, preferably from 1 to 10 and more preferably from 3 to 8.

According to German Offenlegungsschrift 3,708,93 (believed to correspond to U.S. Pat. No. 4,859,744) the graft polymers are obtained by polymerization of resin-forming monomers in the presence of a diene rubber, the polymer of the resin-forming monomers being completely graft-polymerized.

Preferred diene rubbers are homopolymers of butadiene, isoprene, chloroprene and copolymers of these monomers with up to 40% by weight of other monomers, such as acrylonitrile, styrene, alkyl acrylate, alkyl methacrylate and, optionally, relatively small quantities of polyfunctional vinyl monomers, such as divinyl benzene and diol bisacrylates.

The rubbers are at least partially crosslinked and have gel contents of more than 50% by weight, preferably of more than 70% by weight, and more especially from 73% to 98% by weight and are particulate with mean particle size (d₅₀ values) of from 0.09 to 1.0 μm and more especially from 0.09 to 0.6 μm. Particulate rubbers such as these are known and are produced by emulsion polymerization, generally being present in the form of latices.

Particularly preferred graft polymers B are based on diene rubbers having mean particle sizes of from 0.09 to 0.2 μm. In addition to improved weld line strength, these graft polymers also provide the molding compositions with distinctly more favorable toughness at low temperatures.

The graft polymers B according to the invention are those obtained by graft polymerization of from 5 to 90 parts by weight and preferably from 20 to 80 parts by weight of a vinyl monomer or of a mixture of vinyl monomers B.1 (graft shell) onto 10 to 95 parts by weight and preferably 20 to 80 parts by weight diene rubber B.2.

Methyl methacrylate is mentioned as a particularly preferred vinyl monomers. Mixtures of vinyl monomers according to the invention consist of 50 to 95 parts by weight styrene, α-methylstyrene (or other styrenes of which nucleus is substituted by alkyl groups or halogen atoms) or methyl methacrylate on the one hand and of 5 to 50 parts by weight acrylonitrile, methacrylonitrile, methyl methacrylate, maleic anhydride or substituted maleic imides on the other hand.

Preferred copolymers for the synthesis of the graft shell consist of styrene/acrylonitrile (ratio 72:28) or styrene/maleic anhydride (ratios 94:6 to 87:13). Acrylates of primary or secondary aliphatic $C_2$–$C_{10}$ alcohols, preferably n-butyl acrylate or acrylates or methacrylates of tert-butanol, preferably t-butyl acrylate, may additionally be present in relatively small quantities as further vinyl monomer components.

Particularly preferred graft shells may also be synthesized from 30 to 40 parts by weight α-methylstyrene, 52 to 62 parts by weight methyl methacrylate and 4 to 14 parts by weight acrylonitrile.

The graft polymers are prepared in aqueous emulsion by polymerization of the monomers onto a rubber present in aqueous emulsion. Surface-active auxiliaries, such as emulsifiers or dispersants, and, optionally, additives for establishing certain pH values and electrolyte contents during the graft polymerization are normally used. The emulsion graft polymerization may even be carried out in the absence of an emulsifier, particularly when small quantities of monomer, based on the quantity of rubber, are used or when the quantities of emulsifier already present in the rubber emulsion (latex) itself are sufficient to guarantee graft polymerization of the monomers in emulsion with adequate emulsion stability.

Particularly suitable emulsifiers are anionic emulsifiers, preferably alkali salts of fatty acids and aryl sulfonic acids, which are used in quantities of up to 5% by weight and preferably in quantities of up to 2.5% by weight, based on the monomers to be polymerized.

Suitable hydroperoxides are, for example, cumene hydroperoxide, tert-butyl hydroperoxide, hydrogen peroxide, preferably cumene hydroperoxide, and tert-butyl hydroperoxide, i.e. hydroperoxides having long half lives.

According to German Offenlegungsschrift 3,708,913 (believed to correspond to U.S. Pat. No. 4,859,744), the process may be carried out, for example, as follows.

An aqueous emulsion of a partially crosslinked diene rubber is grafted in aqueous emulsion either discontinuously or continuously. At polymerization temperatures of 40° to 70° C. and more especially in the range from 50° to 70° C., the graft monomers and hydroperoxide and also ascorbic acid and, optionally, more emulsifier solutions are added to the rubber emulsion. The quantitative ratios described above should be observed. In exceptional cases, small quantities of heavy metal cations, particularly iron, may be introduced as catalysts into the polymerization reaction as a further component of the initiator system, particularly when it is necessary to use diene rubber emulsions which themselves already contain relatively large quantities of complexing agents. The process is normally carried out without any addition of iron ions. This method is preferred and enables graft polymers free or substantially free from heavy metals to be obtained, which is a technical advantage because it is known that metal traces such as these can have an adverse effect upon the application properties of plastics. The process uses aqueous solutions of ascorbic acid and aqueous solutions of hydroperoxide. It is of advantage to feed hydroperoxides which are insoluble in water, such as cumene hydroperoxide, into the polymerization system in the form of an aqueous emulsion. In emulsions such as these, it is of advantage to use the same emulsifier as in the graft polymerization.

The hydroperoxide and the ascorbic acid may be introduced into the graft polymerization reaction in portions or continuously. In one preferred embodiment, the hydroperoxide is partially introduced into the reactor with the rubber to be grafted. The graft monomers and the remaining ascorbic acid, hydroperoxide and, optionally, emulsifier are separately introduced into the reactor as the polymerization of the graft monomers progresses.

The quantities of hydroperoxide and ascorbic acid are critical. Overdoses of hydroperoxide and/or ascorbic acid adversely affect the graft polymerization; the graft yield diminishes and the molecular weight of the grafted resin and the free resin becomes lower. In addition, underdoses or overdoses of hydroperoxide and ascorbic acid can adversely affect monomer conversion and emulsion stability, so that it becomes technically impossible to carry out the graft polymerization. To optimize the operation of the process, the structure of the graft polymers and their physical properties, the graft polymerization should be carried out at a temperature of 40° to 70° C. and with the quantities of hydroperoxide and ascorbic acid indicated above.

Where the graft polymerization is continued to monomer conversions above 90% by weight and more especially above 98% by weight, storable graft polymer emulsions having polymer contents of 25 to 50% by weight are obtained. The graft polymer itself may readily be isolated from the emulsions by known coagulation techniques (for example, using acids or salts).

Where it is intended to combine the graft polymers with thermoplastic resins which are themselves present in the form of an emulsion, the graft polymer emulsion may be mixed and co-coagulated with the resin emulsion.

The quantity of graft polymer B to be used in accordance with the invention for polyether sulfone molding compositions is between 1 and 95% by weight, preferably between 2 and 60% by weight and more preferably between 3 and 40% by weight, based on 100% by weight of graft polymer and polyether sulfone.

Component C

Thermoplastic resins belonging to the following groups are suitable as further components according to the invention:
C.1 Vinyl copolymers
C.2 Polyalkylene terephthalates
C.3 Aromatic polycarbonates
C.4 Aromatic polyester carbonates These thermoplastic resins may replace at most half the weight and preferably at most one third the weight of the aromatic polyether sulfones of component A.

Vinyl copolymers of component C.1 suitable for use in accordance with the invention are those of at least one monomer from the group (C.1.1) consisting of styrene, α-methylstyrene, and nucleus-substituted styrene with at least one monomer from the group (C.1.2) consisting of acrylonitrile, methacrylonitrile, methyl methacrylate, maleic anhydride, and N-substituted maleic imide.

Thermoplastic copolymers having the composition of component C.1 may be formed as secondary products in the graft polymerization for the production of component B; the quantity of copolymer C.1 usable in accordance with the invention does not include this secondary product of the graft polymerization.

The copolymers of component C.1 are resinous thermoplastic and rubber-free. Particularly preferred copolymers C.1 are those of styrene and/or α-methylstyrene with acrylonitrile and, optionally, with methyl methacrylate.

Particularly preferred ratios by weight in the thermoplastic copolymer C.1 are 60 to 80% by weight C.1.1 and 40 to 20% by weight C.1.2.

Halostyrenes and p-methylstyrene are suitable nucleus-substituted styrenes.

The copolymers of component C.1 are known and may be prepared by radical polymerization, more especially by emulsion, suspension, solution or bulk polymerization. The copolymers of component C.1 preferably have molecular weights $M_W$ (weight average, as determined by light scattering or sedimentation) of from 15,000 to 200,000 and intrinsic viscosities of from 20 to 110 dl/g (as measured in dimethyl formamide at 25° C.).

Polyalkylene terephthalates C.2 in the context of the invention are reaction products of aromatic dicarboxylic acids or reactive derivatives thereof (for example, dimethyl esters or anhydrides) and aliphatic, cycloaliphatic or araliphatic diols and mixtures of these reaction products. They may be prepared by known methods. Kunststoff-Handbuch, Vol. VIII, pages 695 et seq, Carl Hanser Verlag, Munich, 1973.

Preferred polyalkylene terephthalates C.2 contain at least 80 and preferably at least 90 mol-%, based on the dicarboxylic acid component, of terephthalic acid residues and at least 80 and preferably at least 90 mol-%, based on the diol component, of ethylene glycol and/or butane-1,4-diol residues.

In addition to terephthalic acid residues, the preferred polyalkylene terephthalates C.2 may contain up to 20 mol-% of residues of other aromatic or cycloaliphatic dicarboxylic acids containing from 8 to 14 carbon atoms or aliphatic dicarboxylic acids containing from 4 to 12 carbon atoms, such as, for example, residues of phthalic acid, isophthalic acid, naphthalene-2,6-dicarboxylic acid, 4,4'-diphenyldicarboxylic acid, succinic acid, adipic acid, sebacic acid, azelaic acid and cyclohexanediacetic acid.

In addition to ethylene glycol and butane-1,4-diol residues, the preferred polyalkylene terephthalates C.2 may contain up to 20 mol-% and preferably up to 10 mol-% of other aliphatic diols containing 3 to 12 carbon atoms or cycloaliphatic diols containing 6 to 21 carbon atoms, for example, residues of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3- and -1,6-diol, 2-ethylhexane-1,3-diol, 2,2-diethylpropane-1,3-diol, hexane-2,5-diol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(3-β-hydroxyethoxyphenyl)propane and 2,2-bis(4-hydroxypropoxyphenyl)propane (German Offenlegungsschriften 2,407,647, 2,407,776, 2,715,932).

The polyalkylene terephthalates C.2 may be branched through the incorporation of relatively small quantities of trihydric or tetrahydric alcohols or tribasic or tetrabasic carboxylic acids, of the type described, for example, in German Offenlegungsschrift 1,900,270 and in U.S. Pat. No. 3,692,744. Preferred branching agents are, for example, trimesic acid, trimellitic acid, trimethylol ethane and propane, and pentaerythritol.

Particularly preferred polyalkylene terephthalates C.2 are those which have been prepared solely from terephthalic acid or reactive derivatives thereof (for example, dialkyl esters) and ethylene glycol and/or butane-1,4-diol and mixtures of these polyalkylene terephthalates.

The polyalkylene terephthalates preferably used as component C.2 generally have an intrinsic viscosity of from 0.4 to 1.5 dl/g, preferably from 0.5 to 1.3 dl/g and more preferably from 0.6 to 1.2 dl/g, as measured in phenol/o-dichlorobenzene (1:1 part by weight) at 25° C. and at a concentration of 0.5 g/dl.

Suitable aromatic polycarbonates C.3 are homopolycarbonates and copolycarbonates of the type described, for example, in U.S. Pat. No. 2,999,835, British Patent 772,627 and German Offenlegungsschrift 3,334,872. Particularly preferred aromatic polycarbonates are synthesized from bisphenol A and phosgene.

Fully aromatic polyester carbonates C.4 in the context of the invention are synthesized predominantly or exclusively from aromatic $C_8$–$C_{14}$ dicarboxylic acids, $C_6$–$C_{30}$ diphenols and carbonic acid derivatives, for example, phosgene.

Preferred aromatic dicarboxylic acids are, for example, isophthalic acid, terephthalic acid, diphenyl ether 4,4'-dicarboxylic acid, naphthalene-2,6-dicarboxylic acid and mixtures of these acids. Isophthalic acid and terephthalic acid are particularly preferred. The preferred carbonic acid derivative is phosgene.

Preferred diphenols for the production of the fully aromatic polyester carbonates C.4 are compounds corresponding to formula (1)

HO-Z-OH            (I)

in which Z is a difunctional, mononuclear or polynuclear aromatic radical containing from 6 to 30 carbon atoms, the structure of Z being such that the two OH groups are each directly attached to a carbon atom of an aromatic system.

Particularly preferred diphenols are compounds corresponding to the following formula

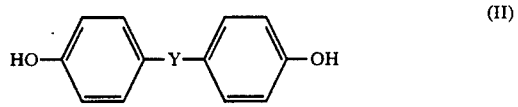

(II)

in which
Y is a single bond, an alkylene or alkylidene radical containing 1 to 7 carbon atoms, a cycloalkylene or cycloalkylidene radical containing 5 to 12 carbon atoms, —O—, —S—,

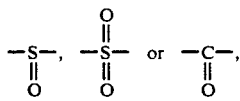

or nucleus-alkylated or nucleus-halogenated derivatives thereof.

Examples of bisohenols are hydroquinone, resorcinol, dihydroxydiphenyls, bis(hydroxyphenyl)alkanes, bis(-hydroxyphenyl)cycloalkanes, bis(hydroxyphenyl) ethers, bis(hydroxyphenyl) ketones, bis(hydroxyphenyl) sulfoxides, bis(hydroxyphenyl) sulfones, and $\alpha,\alpha'$-bis(hydroxyphenyl)diisopropylbenzenes and nucleus-alkylated and nucleu-shalogenated derivatives thereof. The most important diphenols are bisphenol A, tetramethyl bisphenol A, 1,1-bis(4-hydroxyphenyl)isobutane, 1,1-bis(4-hydroxyphenyl)cyclohexane, 4,4'-dihydroxydiphenyl sulfide, 4,4'-dihydroxydiphenyl sulfone and di- and tetrahalogenated derivatives thereof. Bisphenol A is particularly preferred. Mixtures of the diphenols mentioned may also be used.

Possible branching agents are mentioned in German Offenlegungsschriften 2,940,024 and 3,007,934.

Preferred chain terminators for the fully aromatic polyester carbonates C.4 are phenol, alkyl phenols containing $C_1C_{12}$ alkyl groups, halogenated phenols, hydroxy diphenyl, naphthols, chlorocarbonic acid esters of such phenolic compounds and chlorides of aromatic monocarboxylic acids, which may optionally be substituted by $C_1-C_{22}$ alkyl groups and halogen atoms, in quantities of from 0.1 to 10 mol-% (based on diphenols in the case of phenols and on acid chlorides in the case of acid chlorides). Chlorides of aliphatic monocarboxylic acids containing up to 22 carbon atoms are also suitable.

In the synthesis of the fully aromatic polyester carbonates C.4, up to 30 mol-% and preferably up to 20 mol-% of the dicarboxylic acids and dihydroxy compounds may even be replaced by aliphatic units, for example, adipic acid, 1,4-butanediol.

In addition, the fully aromatic polyester carbonates C.4 may be partially synthesized from aromatic hydroxy carboxylic acids, such as p-hydroxybenzoic acid. The proportion of such hydroxy carboxylic acids may be up to 100 mol-% and is preferably from 30 to 50 mol-% (based on bisphenol).

Where isophthalic acid and terephthalic acid are involved together in the synthesis of the fully aromatic polyester carbonates C.4, the terephthalic acid component may amount to between 1 and 99% and preferably to between 25 and 75% of the total ester component.

The fully aromatic polyester carbonates may contain from 1 to 99 mol-% and more especially from 30 to 80 mol-% ester groups, based on the total of ester and carbonate groups.

Both the ester and the carbonate component of the fully aromatic polyester carbonates C.4 may be present in the polycondensate in the form of blocks or in statistical distribution.

The production of the fully aromatic polyester carbonates C.4 is known and is described, for example, in German Offenlegungsschriften 1,495,626, 2,232,877, 2,703,376, 3,000,610, 2,714,544, 2,940,024, and 3,007,934 or in U.S. Pat. No. 3,169,121. The interfacial process is particularly preferred.

The relative solution viscosity ) of the fully aromatic polyester carbonates C.4 is in the range from 1.18 to 1.4 and preferably in the range from 1.22 to 1.3 (as measured on solutions of 0.5 g polyester carbonate in 100 ml $CH_2Cl_2$ solution at 25° C.).

A desired carbonate group content may also be established by mixing fully aromatic polyester carbonate with aromatic polycarbonate. This means that a component C.4 according to the invention is present even when the fully aromatic polyester carbonate is partially replaced, i.e., to an extent of 5 to 95% by weight and preferably 10 to 50% by weight, by an aromatic polycarbonate.

The polyether sulfone molding compositions may contain known additives for aromatic polyether sulfones and for the thermoplastic resins mentioned under C, such as stabilizers, pigments, flow aids, mold release agents, flameproofing agents and antistatic agents.

Equally well-known additives for graft polymers may also be used.

The polyether sulfone molding compositions containing components A, B and, optionally, C and/or effective quantities of typical stabilizers, pigments, flow aids, mold release agents, flameproofing agents and/or antistatic agents are prepared by mixing the particular constituents in known manner and melt-compounding or melt-extruding the resulting mixtures at temperatures of 200° to 330° C. in standard units, such as internal kneaders, single-screw or twin-screw extruders.

Accordingly, the present invention also relates to a process for the production of thermoplastic molding compositions containing components A, B and, optionally, C and/or effective quantities of typical stabilizers, pigments, flow aids, mold release agents, flameproofing agents and/or antistatic agents, characterized in that components A, B and, optionally, C, stabilizers, pigments, flow aids, mold release agents, flameproofing agents and/or antistatic agents are mixed in known manner and the resulting mixture is melt-compounded or melt-extruded in standard units at temperatures in the range from 200° C. to 330° C.

The mixing of the individual constituents may be carried out in known manner both successively and simultaneously both at around 20° C. (room temperature) and at a higher temperature.

The molding compositions according to the invention may be used for the production of moldings of all kinds. More particularly, moldings may be produced by injection molding. Examples of moldings which can be produced from the molding compositions according to the invention are, on the one hand, housing components of all kinds, for example, for domestic appliances, such as juice presses, coffee machines and mixers, and on the other hand cover panels for the building industry and parts for the building industry and, more especially, parts for the automotive industry. In addition, they may be used in the field of electrical engineering, for example, for multiway connectors, by virtue of their very good electrical properties. Another form of processing is the production of moldings by deep drawing from prefabricated sheets or films.

EXAMPLES

Parts are always parts by weight.

1. Components of the compositions

A) Aromatic polyether sulfone 1147.7 parts bis-2,2-(4-hydroxyphenyl)propane and 1435.8 parts bis(4-chlorophenyl) sulfone are dissolved under nitrogen in 4500 parts N-methyl pyrrolidone and 970 parts chlorobenzene and 760 parts anhydrous potassium carbonate are added to the resulting solution. The reaction mixture is heated to 180° C. in 30 minutes and kept at that temperature for 5 hours, a mixture of water and chlorobenzene distilling off. The chlorobenzene is distilled off over another 4 hours. After a reaction time of 6 hours, the reaction mixture is cooled to 60° to 70° C., the polymer is precipitated in methanol, washed with water and dried in vacuo. The product has a reduced viscosity $\eta_{red}$ of 0.52 dl/g ($CHCl_3$ at 25° C.).

B) Graft polymer

B.1

Graft polymer of 50% by weight diene rubber (a) and 50% by weight styrene-acrylonitrile ("SAN") copolymer according to German Offenlegungsschrift 3,708,913 (see U.S. Pat. No. 4,859,744).

a) The graft base is formed by an emulsion (latex) of a partially crosslinked, coarse-particle polybutadiene having a mean particle diameter of 0.38 μm value), and a gel content of 89% by weight. The emulsion contains 50% by weight polymer solids.

b) Preparation of the graft polymer

A mixture of 200 parts by weight latex (a) and 149 parts by weight water is introduced into a reactor and heated to 60°-62° C. The following two solutions or emulsions are successively introduced into the reactor at that temperature:
1. 0.0836 part by weight cumene hydroperoxide
   6.9600 parts by weight water
   0.0600 part by weight Na salt of $C_{14}$-$C_{16}$ alkyl sulfonic acids
2. 0.0557 part by weight ascorbic acid
   6.9600 parts by weight water The following inflow streams are then run into the reactor with stirring over a period of 4 hours at an internal temperature of 60° to 62° C.:
I1. 39.05 parts by weight water
   4.00 parts by weight Na salt of disproportionated abietic acid
   3.10 parts by weight IN sodium hydroxide
   0.62 part by weight cumene hydroperoxide
I2. 72 parts by weight styrene
   28 parts by weight acrylonitrile
I3. 39.8 parts by weight water
   0.105 part by weight ascorbic acid Polymerization is then completed over a period of 6 hours at 60° to 62° C. The monomer conversion is more than 97% by weight.

After stabilization with 1.2 parts by weight phenolic antioxidant per 100 parts by weight graft polymer, the graft polymer is isolated by coagulation with a mixture of acetic acid and Mg sulfate, washed and dried to form a powder.

The SAN grafting produced a graft yield of 89% by weight.

The graft yield was determined by fractional separation with the separating liquids, dimethyl formamide/methyl cyclohexane, in an ultracentrifuge and by determining the quantities and chemical composition of the fractions thus obtained (see R. Kuhn, *Makromol-Chemie*, 177, 1525 (1976)).

B.2

Graft polymer of 50% by weight diene rubber having a mean particle diameter of 0.1 μm ($d_{50}$ value) a gel content of more than 80%. by weight and 50% by weight SAN copolymer (prepared in accordance with German Offenlegungsschrift 3,708,913 and U.S. Pat. No. 4,859,744.

B.3

Graft polymer of 50% by weight diene rubber (a) and 50% by weight SAN copolymer produced by the conventional process (Comparison Example).

1500 parts by weight emulsion (a) and 1030 parts by weight water are initially introduced into a reactor. After heating to 65° C., an initiator solution of 3 parts by weight potassium peroxydisulfate in 50 parts water is introduced. The following two solutions are then introduced into the reactor over a period of 6 hours at 65° C.:
1. 540 parts by weight styrene
   210 parts by weight acrylonitrile
2. 1000 parts by weight water
   13 parts by weight Na salt of disproportionated abietic acid
   10 parts by weight IN sodium hydroxide Polymerization is then completed over a period of 4 hours by stirring at 65° C. The monomer conversion is more than 98% by weight. The graft polymers are stabilized and isolated in the same way as in for B.1. The SAN grafting produced a graft yield of 55% by weight. The graft yield was determined in the same way as for B.1.

Thermoplastic resin

C.1

Styrene/acrylonitrile copolymer with a ratio of styrene to acrylonitrile of 72:28 and an intrinsic viscosity of $\eta$ of 0.55 dl/g (as measured in dimethyl formamide at 20° C.)

C.2

Linear polyethylene terephthalate with an intrinsic viscosity $\eta$ of 0.76 dl/g, as measured in phenol/o-dichlorobenzene (1:1 part by weight) at 25° C. and at a concentration of 0.5 g/dl

C.3

Linear polycarbonate based on bisphenol A having a relative solution viscosity $\eta_{rel}$ of 1.26 to 1.28, as measured in $CH_2Cl_2$ at 25° C. and at a concentration of 0.5 g/100 ml

C.4

Polyester carbonate (ester content 50 mol-%) based on bisphenol A, isophthalic and terephthalic acid (1:1) containing 3 mol-%, based on bisphenol A units, of terminal p-isooctylphenyl groups and having a relative viscosity $\eta_{rel}$ of 1.30 (as measured on a solution of 0.5 g polyester carbonate in 100 ml $CH_2Cl_2$ at 25° C.).

2. Production and testing of the molding compositions

Components A, B and, optionally, C were compounded in a three-liter internal kneader at temperatures in the range from 200° to 280° C.

Unless otherwise stated, moldings were produced in an injection molding machine at 280° C.

The Vicat B softening point was determined in accordance with DIN 53,460.

Notched impact strength was measured by the ISO 180 method on bars measuring $80 \times 10 \times 4$ mm$^3$ (processing temperature: 280° C.) at room temperature, at −20° C., at −40° C. and at −60° C. The tough/brittle transition, i.e., the temperature range in which the first brittle fractures occurred, was determined therefrom.

Weld line strength was determined by measuring impact strength in accordance with DIN 53,453 (Charpy method) along the weld line of test specimens measuring 170×10×4 mm³ gated on both sides (processing temperature: 280° C.).

As can be seen from Table 1, Examples A and B according to the invention show considerably higher weld line strengths for the same or higher Vicat softening points.

TABLE 1

Comparison of the molding compositions and their properties

| Example | A | B.1 | B.2 | B.3 | Vicat B (°C.) | Weld line strength $a_nF$ (kJ/m²) |
|---|---|---|---|---|---|---|
| | | (% by weight) | | | | |
| A | 75 | 25 | — | — | 168 | 19.5 |
| B | 75 | — | 25 | — | 172 | 11.7 |
| C (Comparison) | 75 | — | — | 25 | 167 | 4.3 |
| D | 90 | 10 | — | — | 176 | 17.7 |
| E | 87.5 | 12.5 | — | — | 174 | 18.7 |
| F | 85 | 15 | — | — | 173 | 19.8 |
| G | 70 | 30 | — | — | 161 | 8.0 |
| H | 60 | 40 | — | — | 155 | 6.0 |

As can be seen from Table 2, the molding composition A according to the invention, which contains a particularly preferred graft polymer having a mean particle diameter of 0.1 μm, shows distinctly higher noted impact strength at low temperatures and, hence, a lower tough/brittle transition in addition to the weld line strength improved in accordance with the invention (see Table 1).

TABLE 2

Comparison of the molding compositions and their properties

| Example | Components | | | Notched impact strength ak at −20° C. (kJ/m²) | Tough/brittle transition (°C.) |
|---|---|---|---|---|---|
| | A | B.2 | B.3 | | |
| | (% by weight) | | | | |
| A | 75 | 25 | — | 40 | −30 |
| B (Comparison) | 75 | — | 25 | 19 | −10/−20 |

Even after the addition of another thermoplastic resin (see Table 3, ), the molding composition according to the invention show considerably higher weld line strengths than the molding compositions of the Comparison Examples.

TABLE 3

Comparison of the molding compositions and their properties

| Example | Components | | | | | | Weld line strength $a_nF$ (kJ/m²) |
|---|---|---|---|---|---|---|---|
| | A | B.1 | B.3 | C.1 | C.2 | C.3 | C.4 | |
| | (% by weight) | | | | | | |
| A | 60 | 20 | — | 20 | — | — | — | 10.8 |
| B (Comparison) | 60 | — | 20 | 20 | — | — | — | 4.0 |
| C | 60 | 20 | — | — | 20 | — | — | 6.4 |
| D (Comparison) | 60 | — | 20 | — | 20 | — | — | 4.8 |
| E | 60 | 20 | — | — | — | 20 | — | 21.6 |
| F (Comparison) | 60 | — | 20 | — | — | 20 | — | 11.3 |
| G | 60 | 20 | — | — | — | — | 20 | 17.1 |
| H (Comparison) | 60 | — | 20 | — | — | — | 20 | 10.2 |

What is claimed is:

1. A thermoplastic molding composition comprising
   (A) 75 to 97% by weight, based on the total amount of components (A) and (B), of a linear aromatic polyether sulfone, and
   (B) 3 to 25% by weight, based on the total amount of components (A) and (B), of a diene graft polymer comprising
      (B.1) 5 to 90 parts by weight of a mixture which is grafted on
      (B.2) 10 to 95 parts by weight of a diene rubber, and optionally,
   (C) a thermoplastic resin selected from the group consisting of vinyl copolymer, polyalkylene terephthalate, aromatic polycarbonate and aromatic polyester carbonate,
   wherein said mixture (B.1) contains
      (B.1.1) 50 to 95 parts by weight of at least one member selected from the group consisting of methyl methacrylate, styrene, α-methyl styrene, nucleus substituted styrene wherein substitution is any of $C_{1-4}$ alkyl and halogen, and
      (B.1.2) 5 to 50 parts by weight of at least one member selected from the group consisting of acrylonitrile, methacrylonitrile, methyl methacrylate, maleic anhydride, maleic imide N-substituted by $C_{1-4}$ alkyl or by phenyl, and
   wherein said rubber (B.2) has a mean particle diameter of 0.09 to 1 μm and a gel content of more than 50% relative to the weight of said rubber, and wherein said diene graft polymer (B) is characterized in that an initiator system containing an organic hydroperoxide and ascorbic acid is used in its preparation, and
   wherein at most half of the weight of said aromatic polyether sulfone (A) is replaced by said thermoplastic resin (C).

2. A molding composition of claim 1 wherein the polyether sulfone resin has a structure consisting of units corresponding to

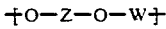

wherein Z is the residue of a dihydric phenol and W is the residue of the benzoid dihalogen compound containing an inert, electron-attracting group, with the proviso that both Z and W are attached to the ether oxygen atoms at aromatic carbon atoms via covalent bonds and at least one of the Z and W contains a sulfone group between aromatic carbon atoms.

3. A molding composition of claim 1 wherein said molding composition contains from 40 to 98% by weight component (A) and from 2 to 60% by weight component (B).

4. A molding composition of claim 1 wherein graft polymer (B) is prepared from 20 to 80 parts by weight graft polymer (B.1) and from 20 to 80 parts by weight diene rubber (B.2).

5. A molding composition of claim 1 wherein diene rubber (B.2) has a mean particle diameter of 0.09 to 0.6 μm.

6. A molding composition of claim 1 wherein diene rubber (B.2) has a gel content of more than 70% by weight, based on said diene rubber (B.2).

7. A molding composition of claim 1 wherein graft polymer (B) is prepared by graft polymerization of component (B.1) in aqueous emulsion in the presence of an emulsion of component (B.2) at a temperature in the range from 40° to 70° C., wherein the initiator system contains from 0.3 to 1.5 parts by weight of a hydroperoxide and from 0.1 to 1 part by weight of ascorbic acid to 100 parts by weight of component (B.1) and the ratio by weight of the hydroperoxide to ascorbic acid is from 0.3 to 15.

8. A molding composition of claim 1 wherein at most one third of the percentage by weight of component (A) is replaced by other thermoplastic resins of component (C).

9. A molding composition of claim 1 wherein said molding composition additionally contains at least one additive selected from the group consisting of stabilizers, pigments, flow aids, mold release agents, flameproofing agents, and antistatic agents.

10. A process for the production of a molding composition of claim 1 comprising
  (a) forming a mixture of components (A), (B), and, optionally, (C), and at least one member selected from the group consisting of stabilizers, pigments, flow aids, mold release agents, flameproofing agents, and antistatic agents and
  (b) melt-compounding or melt-extruding said mixture at an elevated temperature.

11. A molding produced from a composition of claim 1.

* * * * *